3,293,203
THERMOSETTABLE RESIN COMPOSITIONS AND METHOD FOR FORMING LOW FRICTION SURFACE COATINGS
George F. Paulus, Port Huron, Mich., assignor to Acheson Industries, Inc., Port Huron, Mich., a corporation of Michigan
No Drawing. Filed Mar. 26, 1962, Ser. No. 182,667
12 Claims. (Cl. 260—37)

This invention relates to compositions for forming improved adherent, low friction, protective coatings on various substrates, methods of forming such coatings and articles produced thereby.

The primary object of this invention is to provide a liquid dispersion containing finely divided fluorocarbon polymer particles and a binder resin which can be applied to a substrate to obtain an adherent, low friction coating.

A further object of this invention is to provide a method of forming, on a variety of substance surfaces, protective and dry film lubricating coatings which contain uniformly distributed fluorocarbon polymer particles in a continuous film of thermosetting resin.

Another important object of this invention is to provide concentrates containing finely divided, low molecular weight fluorocarbon polymer particles and at least one thermosettable resin, which concentrates are stable, capable of being transported, and suitable for dilution to form the improved dispersions of this invention.

A still further object is to provide a liquid dispersion containing fine particles of low molecular weight fluorocarbon polymer, a resinous binder and an organic solvent for said binder resin which can be packaged in a pressurized propellant gas atomizing spray container, and handled and stored for long periods prior to application.

An additional object is to provide articles coated with a protective and lubricating film containing low molecular weight fluorocarbon polymer particles uniformly distributed in a continuous film of a thermosettable resin.

In accordance with this invention it has been found that a composition which possesses the characteristics to enable the attainment of the above and related objects can be made by combining fine particles of low molecular weight fluorocarbon polymer with a thermosettable resin and sufficient solvent for that resin to form a dispersion. The solvent must be capable of dissolving the selected thermosettable resin and be incapable of dissolving the fluorocarbon polymer particles, and may constitute the entire dispersing medium or be only a part thereof. As indicated in greater detail hereinafter, the dispersing medium may be non-aqueous, or may be partly water.

Low molecular weight fluorocarbon polymers which have been found to be suitable for the purposes of this invention are those fluorocarbon polymers having a molecular weight in the range of about 2,000 to about 10,000 and in the form of solid, fine particles having a size in the range of about ½ micron to about 10 microns, and an average particle size of about 5 microns or less. By the term fluorocarbon polymer as used hereinafter and in the appended claims is meant the polymers formed from ethylene, propylene, butylene and copolymers thereof which are completely fluorine saturated, e.g., tetrafluoroethylene polymers or substituted with fluorine and chlorine, e.g., chloro-trifluoroethylene polymers and copolymers such as tetrafluoroethylene-hexafluoropropylene polymers, tetrafluoroethylene-octofluorobutylene polymers, etc. Such polymers are formed by the method now known to those skilled in the art from the fluoro, or fluorochloro substituted monomers by polymerization in a non-reactive solvent, e.g., trichlorotrifluoroethane, to the desired molecular weight and effecting termination of the polymerization by adding a non-polymerizable component capable of joining to the polymer to provide a terminating end group, such as methanol, isopropanol, butanol, carbon tetrachloride, etc. A preferred group of such polymers are those having an average molecular weight in the range of 4,000–6,000, with the best results, to date, having been achieved with tetrafluoroethylene polymers having an average molecular weight of about 6,000.

It has also been found that the low molecular weight fluorocarbon polymers, above described, may be used in admixture with high molecular weight polytetrafluoroethylene particles having a size in the range of 0.1 micron to 3 microns of the type made in accordance with the procedures described in U.S. Patents 2,534,058 and 2,478,229, the molecular weight of which high molecular polytetrafluoroethylenes is in the range of about 500,000 to about 10 million. Such high molecular weight polytetrafluoroethylenes are commercially available as aqueous suspensions and have been found to be capable of conferring beneficial characteristics on the above described low molecular weight fluorocarbon polymer-containing compositions in proportions up to an amount equal to the low molecular weight fluorocarbon polymer, in terms of solids, by weight.

The terms "thermosettable resins" and "thermosetting resins" as used herein and in the appended claims are intended in their normally understood sense, to include all of the classes of specific resins, modified and unmodified, and compatible admixtures thereof, which harden or cure into a permanent shape when heated or oxidized. This specifically includes the classes broadly designated the phenolic resins, the epoxy resins, the alkyd resins, the polyurethane resins, the amino resins, i.e., urea, melamine and triazine resins, the thermosetting silicone resins, and the thermosetting acrylic resins.

Phenolic resins which can be used satisfactorily include the condensation products of phenol or substituted phenols, such as cresol, resorcinol or butylphenol with aldehydes, such as formaldehyde, furfural, etc., and phenolic resins which have been modified with, for example, rosins, rosin esters, alkyds, etc.

The urea formaldehyde resins are the condensation products of urea and formaldehyde or its polymers and the melamine resins are the condensation products of melamine and formaldehyde, and are particularly useful for leather or applications requiring hot water resistance.

Alkyd resins include both the saturated and unsaturated esters and polyesters of polybasic acids and polyhydric alcohols, such, for example, as the esters of maleic, fumaric, phthalic or adipic acid, etc., and a glycol, glycerol, sorbitol, etc. These resins may be modified with phenolics, various drying or semi-drying oils, etc.

The epoxy resins broadly include the condensation products of the reaction of epichlorohydrin and bisphenols or bifunctional hydroxyl-containing compounds. These polymers can be modified satisfactorily with polyester resins, the phenolic resins, certain fatty acids and the like.

The polyurethane resinous materials are the interreaction products of a polyester or polyether and an isocyanate chosen to cure to a solid thermoset film, and preferably are the product of interreacting a saturated polyester and a 2-4, toluene di-isocyanate and its derivatives.

The suitable silicone resins are the thermosetting alkyl silicones, such as methyl silicone having a $CH_3$ to Si ratio between about 1.2 and 1.5, or the ethyl silicones having a $C_2H_5$ to Si ratio between about 0.5 to about 1.5, or the alkyl-aryl silicones containing selected quantities of alkyl and aryl groups to give good adhesive and strength properties, such as methylphenyl silicone having about equal proportions of methyl and phenyl groups and a ratio to Si of about 1.8. The silicone oils and greases are not usable for the purposes of this invention.

The compositions of this invention may also contain other ingredients such as conventional fillers, coloring agents, driers, and the like so long as the quantity thereof does not prevent the thermosettable resin, upon curing, from forming a strong bond both to the surface of the substrate and to the fluorocarbon polymer particles distributed therein, and does not destroy the lubricant character of the coating.

The fluorocarbon polymer particles of this invention when held to the substrate by the thermoset resin as the discontinuous phase in the continuous resin phase function extremely satisfactorily as solid lubricant particles and these particles are firmly anchored and remain in place in a variety of friction applications. It is also possible, and in some cases desirable, to incorporate other solid lubricating particles in the dispersions. Suitable particles for this purpose may include one or more of the low friction finely divided particulate materials such as graphite, molybdenum disulfide, boron nitride, talc, vermiculite, cadmium chloride, chromic chloride, manganous chloride, nickelous chloride, tungsten disulfide, silver sulfide, metal-free phthalocyanine, and lead monoxide.

As above generally indicated, the dispersing medium for use in the compositions of this invention functions to dissolve the resin and form a liquid dispersion of the fluorocarbon polymer particles of the desired consistency to enable easy application to the surface to be coated such as, for example, by spraying, atomizing, brushing, dipping or the like. The dispersing medium must be incapable of dissolving the fluorocarbon polymer. Inasmuch as the fluorocarbon polymers of this invention are insoluble in most organic solvents any of the common aliphatic and aromatic hydrocarbons, ethers, esters, ketones, alcohols, chlorocarbons, etc., function satisfactorily as the solvent portion of the dispersing medium. The best solvent for any specific formulation may be selected on the basis of its ability to dissolve the selected thermosettable resin and compatibility with the other components of the dispersing medium, if any. While organic solvents represent the preferred materials for use as the entire dispersing media, particularly in the spray and pressurized container forms of this invention, water may be present in combination with the organic solvent, in a substantial quantity, for example, in a proportion up to an amount about equal to the quantity of organic solvent which is present. In such a dispersion a water-miscible organic solvent should be selected, or at least a portion of a water-miscible organic solvent is added to couple the water and water-immiscible solvent so as to form a compatible composition. While it is possible to use a single organic solvent as the dispersing medium, in most cases it is preferable to use a blend of organic solvents to obtain the optimum physical characteristics, such as application ease, controlled volatility, etc.

Organic solvents and solvents and solvent blends which are generally suitable for use in forming the dispersing medium with the phenolic resins of this invention include the alcohols, esters, aromatic hydrocarbons, and ketones. Specific solvents which have been successfully used have included one or more of the following, n-butyl alcohol, toluene, methyl isobutyl ketone, ethylene glycol monoethyl ether acetate and amyl acetate.

Organic solvents and solvent blends generally useful in forming the dispersing medium with the urea formaldehyde resins include the alcohols, aromatic hydrocarbons, and ketones. Specific solvents in these classes that are satisfactory include one or more of n-butyl alcohol, toluene, xylene, ethylene glycol monoethyl ether acetate and methyl isobutyl ketone.

Organic solvents and solvent blends for use with the alkyd resins include, in general, the aliphatic and aromatic hydrocarbons. Specific hydrocarbons successfully used in this invention have included one or more of xylene, toluene, and mineral spirits.

The epoxy resins are soluble, broadly stated, in the alcohols, esters, glycols, aromatic hydrocarbons, and ketones. Specific organic solvents and solvent blends of this invention which are satisfactory include one or more of n-butyl alcohol, ethylene glycol monoethyl ether acetate, toluene, methyl isobutyl ketone, and xylene.

Organic solvents and solvent blends generally useful as the dispersing medium with the polyurethane coating resins include the esters, ketones and aromatic hydrocarbons. Specific solvents which have been used satisfactorily include one or more of xylene, toluene, methyl isobutyl ketone and ethyl acetate.

The thermosetting silicone resins are soluble in the esters, ketones, chlorinated hydrocarbons, aromatic hydrocarbons and aliphatic hydrocarbons. Specific solvents and solvent blends used satisfactorily in this invention include at least one of toluene, xylene, ethylene glycol monoethyl ether acetate, n-butyl alcohol, trichloroethylene, and methyl ethyl ketone.

Thermosetting acrylic resins are generally soluble in the ketones and aromatic hydrocarbons, and specific solvents and solvent blends which are satisfactory to form the compositions of this invention include at least one of n-butyl alcohol, toluene, xylene, ethylene glycol monoethyl ether acetate, octyl alcohol, and high flash point petroleum naptha.

The substrates which can be satisfactorily coated include metals, glass, wood, leather, rubber, plastics and the like. The substrates which can be coated must be capable of withstanding without detriment any solvency effects of the dispersing medium and the temperatures used to cure the thermosetting resins. Certain of the thermosettable resins, such as the alkyds, may be modified to include curing agents of a type which enable those resins to cure to a satisfactorily adherent, polymer retaining condition without using elevated temperature conditions, and the use of such resins is preferred where elevated temperature conditions are detrimental to the substrate in any way. The adhesion of the coating is enhanced, in general, by preliminarily roughening the surface such as by mechanical abrasion or by grit blasting, and where the substrate is metal, it is often desirable to use additional surface conditioning treatments to form thereon a coating of a metallic phosphate, oxalate, oxide or sulfide, or a mixture thereof, acid etching, chromate coating, and the like.

The compositions of this invention may be applied to the substrate to be coated by brushing, atomizing, spraying or dipping, but the most suitable and commercial technique is to apply the dispersions by spraying. The coatings of this invention are best applied in relatively thin layers and where a relatively thick total coating is desired the coating is preferably built up by applying thin multiple layers and allowing them to air-dry between applications. For most applications a coating having a thickness in the range of about 0.1 to about 1.5 mils provides the most satisfactory over-all characteristics. A preferred coating thickness is one within the range of about 0.3 to about 0.8 mil. After the desired thickness of coating is obtained by the above steps, the coating is finally cured by baking at a temperature which is sufficient to cure or thermoset the particular thermosettable resin which is in the coating.

The compositions of this invention may vary from relatively dilute to relatively concentrated materials, the dilute compositions being directly applicable for spray or pressure atomization application to the surface to be coated, whereas, the more concentrated solutions are suitable for application by brushing or with rollers or may be further diluted prior to use. The compositions to be applied by spraying or from pressurized atomization containers may contain as low as about ½% solids. With suitable spraying apparatus, the solids content may be substantially increased, to a range of 15 or 20% solids, for example, but the compositions of this invention remain as stable dispersions at solids concentrations as high as about 50%. Relative quantities of resin solids and fluorocarbon polymer solids may vary over a relatively wide range depending upon the specific requirements of the particular application for the coating and may vary from about 5% to about 60% of polymer solids, by weight of the total solids and from about 40% to about 95% of thermosettable resin solids, by weight of the total solids. Variation of the fluorocarbon polymer solids and the thermosettable resin solids within the above given ranges produce variations in the ultimate coefficient of friction, adhesion, impact resistance, flexibility and wear life of the coating which is formed, and it will be understood that the optimum relative proportion of each can be easily established by a few simple tests under the specific conditions of use when the final application is known.

To date, the best results have been obtained from the use of fluorocarbon polymer solids in the range from about 10% to about 45% and thermosettable resin solids in the range of about 55% to about 90%, by weight of the total solids in the dispersions.

As above indicated, the fluorocarbon polymer solids may be partially the specified high molecular weight tetrafluoroethylene finely divided particles, and for this purpose the ultimate dispersion may contain up to about 30% of such high molecular tetrafluoroethylene polymer particles, by weight of the total solids. Fillers and other additives are preferably restricted to not more than about 10%, by weight of the total solids, and quantities of graphite, molybdenum disulfide, or other lubricating particulate solids which are added to the low molecular weight fluorocarbon polymer solids is preferably restricted to not more than about 40%, by weight of the total solids.

In the following examples, parts means parts by weight.

*Example I*

A dispersion was prepared by blending together a dispersing medium consisting of 20.8 parts of ethylene glycol monoethyl ether acetate, 20.8 parts of toluene, 10.4 parts of n-butanol, and 56.4 parts of methyl isobutyl ketone. This dispersing medium was blended with 73.6 parts of AMS–3132–B phenol formaldehyde varnish, and 18.0 parts of low molecular weight tetrafluoroethylene polymer (having an approximate molecular weight of 2,000, particle size of approximately 5 microns, density of 2.09 gm./ml., softening point of 424° F., and crystalline melting point of 534° F.) to form a uniform dispersion. This dispersion was then placed in a DeVilbiss spray gun, model MBC with a #30 nozzle and a D–EX tip and sprayed on a plurality of 3" x 6" clean low carbon steel panels by using an air pressure of 40 lbs./sq. in., the nozzle being approximately 18 inches from the panel. After spraying for 8 passes, with short drying periods between passes, the panels were allowed to dry in air and were then cured at a temperature of about 300° F. in an oven for one hour, withdrawn from the oven and cooled in the air. An inspection of the coated panel surfaces showed that the surfaces were covered with a film having a thickness of 0.5 mil which consisted of a network of low molecular weight tetrafluoroethylene polymer particles uniformly distributed in a continuous film of phenol formaldehyde resin. The surface was tested for coefficient of static friction by means of 3-ball slider, and had a value of 0.079. When tested for impact, using a Gardner Laboratory Inc. variable impact tester, no flaking or cracking occurred after being subjected to an impact of 28 inch-pounds. The panels were crack-free after bending through an angle of approximately 150° over a ¼" mandrel. The wear resistance of the coating was established by applying a uniform coating in the same manner to the outside surfaces of a plurality of bearing races. The coatings were tested on a Hartmann (Modified McMildlan) Tester by loading the level arm with a 5-pound load and running the test to failure as indicated by an increase in temperature to 180° F. The bearings races so coated were found to have an average life of 2½ hours.

AMS–3132–B is a phenol-aformaldehyde resin varnish conforming to the specification published by the Society of Automotive Engineers, "Varnish, Synthetic Resin, Corrosion Preventative," June 15, 1952, and is a phenol-formaldehyde thermosetting resinous product having 28%–32% solids in an organic solvent, and containing about 0.1% blue dye.

*Example II*

A dispersion was prepared in the same manner as in Example I and using the same materials and amounts, except that the low-molecular weight tetrafluoroethylene polymer used had an approximate molecular weight of 3,000, particle size of approximately 5 microns, density 2.16 gm./ml., and softening point of 510° F.

When applied to the same substrates as used in Example I, the resultant 0.5 mil film had a coefficient of friction of 0.070, a wear life of 2½ hours as measured on the Hartmann Tester, and successfully passed the same impact and bend tests.

*Example III*

A dispersion was prepared using the same procedure as Example I but using the following materials:

| | Parts |
|---|---|
| Alkylated urea-formaldehyde resin (Syn-U-Tex 402) [1] | 86.5 |
| Ethylene glycol monoethyl ether | 69.4 |
| Toluene | 181.4 |
| n-Butyl alcohol | 34.7 |
| Low molecular weight tetrafluoroethylene polymer (as in Example I) | 28.0 |

[1] Syn-U-Tex 402 designates a 60% solids solution of an alkylated urea-formaldehyde condensation product having an acid value of 3 maximum, a Gardner-Holdt viscosity of V–Y in 7 butanol :1 xylol.

When applied to steel panels as in Example I, and cured for 30 minutes at 350° F., a smooth 5-mil coating was obtained.

When tested as in Example I, a coefficient of friction of 0.052 was obtained, and the adhesion was satisfactory as measured by the impact, and bend tests. A wear life of 2 hours was obtained when tested on the Hartmann machine under 5 pounds of load.

*Example IV*

The procedure of Example I was followed to prepare a dispersion from the following materials.

| | Parts |
|---|---|
| Epoxy modified phenol formaldehyde resin (Enterprise 79271) [1] | 78.2 |
| Ethylene glycol monoethyl ether acetate | 28.7 |
| Toluene | 28.7 |
| n-Butyl alcohol | 14.4 |
| Methyl isobutyl ketone | 40 |
| Low molecular weight tetrafluoroethylene polymer (as in Example I) | 10 |

[1] Enterprise 79271 designates a 38% solution in an organic solvent of an epoxy modified phenol formaldehyde resin product conforming to specification MIL–V–12276A, type III.

When applied to steel panels, as in Example I, and cured for 30 minutes at 450° F., the 0.5 mil coating was smooth and adherent. When tested as in Example I, the coating passed the impact and bend tests, has a coefficient of friction of 0.052, and a wear life of 1 hour.

*Example V*

The procedure of Example I was followed to produce a dispersion from the following ingredients.

|  | Parts |
|---|---|
| Thermosetting silicone resin (DC–806A)[1] | 104 |
| Ethylene glycol monoethyl ether acetate | 62.4 |
| Toluene | 62.4 |
| n-Butyl alcohol | 31.2 |
| Trichlorotrifluoroethane | 112 |
| Zinc octoate (8%) | 0.7 |
| Low molecular weight tetrafluoroethylene polymer (of Example I) | 28 |

[1] DC–806A designates a 50% solution in xylene of a thermosetting silicone resin which forms a hard, water resistant film, and has a Gardner-Holdt viscosity of D–H, a Gardner color of 2.

When applied to steel panels as in Example I and cured for 60 minutes at 480° F., the 0.4 mil coating was smooth and adherent. When subjected to the tests of Example I, the coating passed the impact and bend test, had a coefficient of friction of 0.061 and a wear life on the Hartmann Tester of ¼ hour.

*Example VI*

A dispersion was prepared by the procedure of Example I using the following materials:

|  | Parts |
|---|---|
| Soya oil alkyd resin (Aroplaz 6006)[1] | 104.0 |
| Xylene | 268.0 |
| Lead octoate (24%) | .87 |
| Cobalt octoate (6%) | .35 |
| Low-molecular weight tetrafluoroethylene polymer (as in Example I) | 28.0 |

[1] Aroplaz 6006 is a 50% solution in xylene of a soya oil alkyd resin having a Gardner-Holdt viscosity of W–Y, a Gardner color of 6 maximum, an acid number of 6–10.

When applied to steel panels as in Example I and air-cured, the 0.6-mil coating was smooth and adherent. The coating had the following properties when testing as in Example I: the impact and bend tests were satisfactorily passed, the coefficient of friction was 0.079 and the wear life on the Hartmann Tester was 1 hour.

*Example VII*

A dispersion was prepared following the procedure of Example I using the following materials:

|  | Parts |
|---|---|
| Epoxy resin (Epi-Rez 201)[1] | 115.5 |
| Ethylene glycol monoethyl ether | 57.8 |
| Toluene | 57.8 |
| n-Butyl alcohol | 28.9 |
| Methyl isobutyl ketone | 112.0 |
| Low-molecular weight tetrafluoroethylene polymer (as in Example I) | 28.0 |

[1] Epi-Rez 201 designates a 45% solution in organic solvent of what is understood to be an epoxy-containing phenolic ether resin, having a 1,2 epoxy equivalency greater than 1, combined with proper curing agents to cure it at elevated temperatures.

This dispersion was applied to steel panels as in Example I and cured for 30 minutes at 350° F. The 0.3-mil coating was smooth and adherent and when subjected to the tests of Example I the following results were obtained: The impact and bend tests were successfully passed, the coefficient of friction was 0.044, and the wear life on the Hartmann Tester was 1 hour.

*Example VIII*

A dispersion was prepared using the procedure of Example I using the following ingredients:

|  | Parts |
|---|---|
| Thermosetting acrylic resin (Polytex 902)[1] | 94.5 |
| Ethylene glycol monoethyl ether | 66.2 |
| Toluene | 66.2 |
| n-Butyl alcohol | 33.1 |
| Low molecular weight tetrafluoroethylene polymer (as in Example I) | 28.0 |
| Methyl isobutyl ketone | 112.0 |

[1] Polytex 902 is a 55% solution in a blend of 82% xylene: 18% butanol of a thermosetting acrylic acid copolymer, having a Gardner-Holdt viscosity of U–W, a Gardner color of 2 maximum.

This dispersion was applied to steel panels as in Example I and cured for 30 minutes at 350° F. A 0.2-mil coating was formed, which was smooth and adherent. When tested as in Example I, the following results were obtained: The coefficient of friction was 0.070, the wear life on the Hartmann Tester was ¼ hour, and the impact and bend tests were successfully passed.

*Example IX*

A dispersion was prepared following the procedure of Example I using the following materials:

|  | Parts |
|---|---|
| Polyurethane composition (St. Clair 8813)[1] | 193 |
| Toluene | 67 |
| Methyl isobutyl ketone | 112 |
| Low molecular weight tetrafluoroethylene polymer (as in Example I) | 28 |

[1] St. Clair 8813 designates a 29% solution in organic solvents of a polyurethane coating resin.

This dispersion was applied by spraying and dipping to rubber automobile window moldings, and cured for 45 minutes at 300° F. The coating formed was smooth and slippery, and could be flexed without cracking or flaking of the coating.

*Example X*

A dispersion was prepared following the procedure of Example I using the following materials:

|  | Parts |
|---|---|
| AMS–3132–B phenol formaldehyde varnish (as used in Example I) | 33.4 |
| Ethylene glycol monoethyl ether acetate | 22.6 |
| Toluene | 22.6 |
| Butyl alcohol | 11.4 |
| Methyl isobutyl ketone | 80.4 |
| Low molecular weight tetrafluoroethylene polymer (as used in Example I) | 20.0 |
| Tungsten disulfide | 10.0 |

When applied to metal substrates as in Example I, and cured for 60 minutes at 300° F., a smooth adherent coating of 0.4 mil thickness was formed. The coating had a coefficient of 0.079, a Hartmann wear life of 1½ hours, and successfully passed the impact and bend tests.

*Example XI*

A dispersion was made following the procedure of Example I from the following ingredients:

|  | Parts |
|---|---|
| AMS–3132–B phenol formaldehyde varnish (as used in Example I) | 150.0 |
| Ethylene glycol monoethyl ether acetate | 32.0 |
| Toluene | 32.0 |
| n-Butyl alcohol | 16.0 |
| Methyl isobutyl ketone | 54.0 |
| Low molecular weight tetrafluoroethylene polymer (as used in Example I) | 13.5 |

To this dispersion 5 parts of "Teflon" 30, which is a 60% aqueous dispersion of high molecular weight tetrafluoroethylene polymer, of average particle size of 0.1 micron to 3 microns, with a non-ionic surface active agent, and marketed by E. I. du Pont de Nemours & Co., were added and uniformly blended into the dispersion.

This dispersion was then applied to metal panels and bearing races as detailed in Example I. The 0.6-mil coating obtained was smooth and slippery, and when tested as in Example I, these results were obtained. The coefficient of friction value was 0.052, the impact and bend tests were successfully passed, and the Hartmann tester wear life was 2 3/10 hours.

The following examples are set forth in abbreviated form to illustrate other suitable relative quantities of materials and ingredients:

*Example XII*

| | Parts |
|---|---|
| AMS-3132-B varnish | 110 |
| Low molecular weight tetrafluoroethylene polymer (as used in Example I) | 27 |
| Ethylene glycol monoethyl ether acetate | 22 |
| Toluene | 22 |
| n-Butanol | 11 |
| Methyl isobutyl ketone | 108 |

*Example XIII*

| | Parts |
|---|---|
| AMS-3132-B varnish | 150 |
| Low molecular weight tetrafluoroethylene polymer (as used in Example I) | 15 |
| Ethylene glycol monoethyl ether acetate | 30 |
| Toluene | 30 |
| n-Butanol | 15 |
| Methyl isobutyl ketone | 60 |

Coefficient of friction—0.061.
Hartmann Wear Life—6 hrs.

*Example XIV*

| | Parts |
|---|---|
| AMS-3132-B varnish | 170 |
| Low molecular weight tetrafluoroethylene polymer (as used in Example I) | 9 |
| Ethylene glycol monoethyl ether acetate | 34 |
| Toluene | 34 |
| n-Butanol | 17 |
| Methyl isobutyl ketone | 36 |

Coefficient of friction—0.043.
Hartmann Wear Life—3 hrs.

*Example XV*

| | Parts |
|---|---|
| AMS-3132-B varnish | 47.2 |
| Graphite | 15.0 |
| Low molecular weight tetrafluoroethylene polymer (as used in Example I) | 15.0 |
| Ethylene glycol monoethyl ether acetate | 65.1 |
| Toluene | 65.1 |
| n-Butanol | 32.6 |
| Methyl isobutyl ketone | 60.0 |

Coefficient of friction—0.07.
Hartmann Wear Life—1 hr.

What is claimed is:

1. A dispersion for use in forming low friction surface coatings consisting essentially of a fluorocarbon polymer selected from the group consisting of fluorinated and fluoro-chlorinated polymers of $C_2$–$C_4$ olefins having a molecular weight in the range of about 2,000 to about 10,000 and being in the form of fine particles having a size within the range of about ½ to about 10 microns, at least one thermosettable resin dissolved in a solvent for said resin, said dispersion containing total solids in the range of about ½% to about 50%, said fluorocarbon polymer constituting between about 5% and about 60%, by weight of the total solids, and said thermosettable resin constituting between about 40 and about 95%, by weight of the total solids.

2. A dispersion for use in forming low friction surface coatings consisting essentially of a fluorocarbon polymer selected from the group consisting of fluorinated and fluoro-chlorinated polymers of $C_2$–$C_4$ olefins having a molecular weight in the range of about 4,000 to about 6,000 and being in the form of fine particles having a size within the range of about ½ to about 10 microns, at least one thermosettable resin dissolved in a solvent for said resin, said dispersion containing total solids in the range of about ½% to about 50%, said fluorocarbon polymer constituting between about 5% and about 60%, by weight of the total solids, and said thermosettable resin constituting between about 40 and about 95%, by weight of the total solids.

3. A dispersion in accordance with claim 2 wherein said fluorocarbon polymer is a tetrafluoroethylene polymer.

4. A dispersion for use in forming low friction surface coatings consisting essentially of at least one fluorocarbon polymer selected from the group consisting of fluorinated and fluoro-chlorinated polymers of $C_2$–$C_4$ olefins having a molecular weight in the range of about 2,000 to about 10,000 and being in the form of fine particles having a size in the range of about ½ microns to about 10 microns and an average size of less than about 5 microns, at least one thermosettable resin dissolved in the solvent for said resin, finely divided polytetrafluoroethylene having a molecular weight above about 500,000 in an amount up to about 30%, by weight of the total solids, said fluorocarbon polymer constituting about 5 to about 60%, by weight of the total solids, said thermosettable resin constituting about 40 to about 95% of the total solids, and said dispersion containing about ½% to about 50% total solids.

5. A dispersion for use in forming low friction surface coating consisting essentially of at least one fluorocarbon polymer selected from the group consisting of fluorinated and fluoro-chlorinated polymers of $C_2$–$C_4$ olefins having a molecular weight in the range of about 2,000 to about 10,000 and being in the form of fine particles having a size in the range of about ½ micron to about 10 microns and an average size of less than about 5 microns, at least one thermosettable resin dissolved in a solvent for said resin, finely divided polytetrafluoroethylene having a molecular weight above about 500,000 in an amount up to about 30%, by weight of the total solids, finely divided lubricating particles selected from the group consisting of graphite, molybdenum disulfide, boron nitride, talc, vermiculite, cadmium chloride, chromic chloride, manganous chloride, nickelous chloride, tungsten disulfide, silver sulfide, metal-free phthalocyanine, and lead monoxide in an amount up to about 40%, by weight of the total solids, said fluorocarbon polymer constituting about 5 to about 60%, by weight of the total solids, said thermosettable resin constituting about 40 to about 95% of the total solids, and said dispersion containing about ½% to about 50% total solids.

6. A dispersion for use in forming low friction surface coatings consisting essentially of a fluorocarbon polymer selected from the group consisting of fluorinated and fluoro-chlorinated polymers of $C_2$–$C_4$ olefins having a molecular weight in the range of about 2,000 to about 10,000, at least one thermosettable resin dissolved in a solvent for said resin, said fluorocarbon polymer constituting about 10 to about 45%, by weight of the total solids, and said thermosettable resin constituting about 55 to about 90%, by weight of the total solids.

7. A dispersion for use in forming low friction surface coatings consisting essentially of a fluorocarbon polymer selected from the group consisting of fluorinated and fluoro-chlorinated polymers of $C_2$–$C_4$ olefins having a molecular weight in the range of about 2,000 to about 10,000 and being in the form of fine particles having a size within the range of about ½ to about 10 microns, at least one thermosettable resin dissolved in a solvent for said resin, said dispersion containing total solids in the range of about ½% to about 50%, said fluorocarbon polymer constituting between about 10% and about 45%, by weight of the total solids, and said thermosettable resin constituting between about 55 and about 90%, by weight of the total solids.

8. A dispersion in accordance with claim 7 wherein said fluorocarbon polymer is tetrafluoroethylene and said thermosettable resin is a phenol aldehyde resin.

9. A method of forming an adherent, low friction coating on a substrate which comprises the steps of applying to the surface thereof a dispersion consisting essentially of a fluorocarbon polymer selected from the group consisting of fluorinated and fluoro-chlorinated polymers of $C_2$–$C_4$ olefins having a molecular weight in the range of about 2,000 to about 10,000, at least one thermosettable resin dissolved in a solvent for said resin, said fluorocarbon polymer constituting about 5 to about 60%, by weight of the total solids, and said thermosettable resin constituting about 40 to about 95%, by weight of the total solids, and curing said dispersion at an elevated temperature until an adherent coating is formed.

10. A method of forming an adherent, low friction coating on a substrate which comprises the steps of applying to the surface thereof a dispersion consisting essentially of a fluorocarbon polymer selected from the group consisting of fluorinated and fluoro-chlorinated polymers of $C_2$–$C_4$ olefins having a molecular weight in the range of about 2,000 to about 10,000 and being in the form of fine particles having a size within the range of about ½ to about 10 microns, at least one thermosettable resin dissolved in a solvent for said resin, said dispersion containing total solids in the range of about ½% to about 50%, said fluorocarbon polymer constituting between about 5% and about 60%, by weight of the total solids, and said thermosettable resin constituting between about 40 and about 95%, by weight of the total solids, and curing said dispersion at an elevated temperature until an adherent coating is formed.

11. A method of forming an adherent, low friction coating on a substrate which comprises the steps of applying to the surface thereof a dispersion consisting essentially of at least one fluorocarbon polymer selected from the group consisting of fluorinated and fluoro-chlorinated polymers of $C_2$–$C_4$ olefins having a molecular weight in the range of about 2,000 to about 10,000 and being in the form of fine particles having a size in the range of about ½ micron to about 10 microns and an average size of less than about 5 microns, at least one thermosettable resin dissolved in the solvent for said resin, finely divided polytetrafluoroethylene having a molecular weight above about 500,000 in an amount up to about 30%, by weight of the total solids, said fluorocarbon polymer constituting about 5 to about 60%, by weight of the total solids, said thermosettable resin constituting about 40 to about 95% of the total solids, said dispersion containing about ½% to about 50% total solids, and curing said dispersion at an elevated temperature until an adherent coating is formed.

12. A method of forming an adherent, low friction coating on a substrate which comprises the steps of applying to the surface thereof a dispersion consisting essentially of at least one fluorocarbon polymer selected from the group consisting of fluorinated and fluoro-chlorinated polymers of $C_2$–$C_4$ olefins having a molecular weight in the range of about 2,000 to about 10,000 and being in the form of fine particles having a size in the range of about ½ micron to about 10 microns and an average size of less than about 5 microns, at least one thermosettable resin dissolved in the solvent for said resin, finely divided polytetrafluoroethylene having a molecular weight above about 500,000 in an amount up to about 30%, by weight of the total solids, finely divided lubricating particles selected from the group consisting of graphite, molybdenum disulfide, boron nitride, talc, vermiculite, cadmium chloride, chromic chloride, manganous chloride, nickelous chloride, tungsten disulfide, silver sulfide, metal-free phthalocyanine, and lead monoxide in an amount up to about 40%, by weight of the total solids, said fluorocarbon polymer constituting about 5% to about 60%, by weight of the total solids, said thermosettable resin constituting about 40% to about 95%, by weight of the total solids, said dispersion containing about ½% to about 50% total solids, and curing said dispersion at an elevated tmeperature until an adherent coating is formed.

References Cited by the Examiner
UNITED STATES PATENTS

| | | |
|---|---|---|
| 2,668,157 | 2/1954 | Emig et al. |
| 2,777,783 | 1/1957 | Welch. |
| 2,824,060 | 2/1958 | White. |
| 2,888,364 | 5/1959 | Bauer _____ 260—900 |
| 2,951,047 | 8/1960 | Lantos. |
| 2,969,403 | 1/1961 | Frey et al. _____ 260—653.1 |
| 2,976,257 | 3/1961 | Dawe et al. |
| 3,051,683 | 8/1962 | Mallouk. |

OTHER REFERENCES

Rudner, "Fluorocarbons," published by Reinhold Corp., New York, 1958, pages 23–24.

MORRIS LIEBMAN, *Primary Examiner.*

LEON J. BERCOVITZ, *Examiner.*

J. A. SEIDLECK, A. LIEBERMAN, *Assistant Examiners.*